Sept. 26, 1939.　　T. E. DADSON　　2,174,079
HEATING DEVICE
Filed Nov. 14, 1936　　2 Sheets-Sheet 2
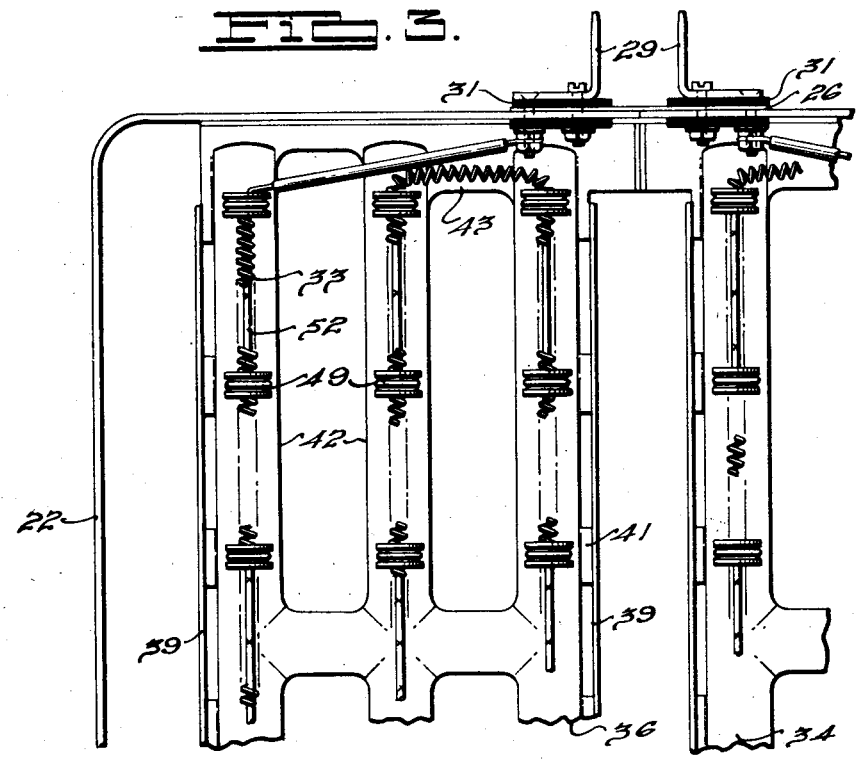
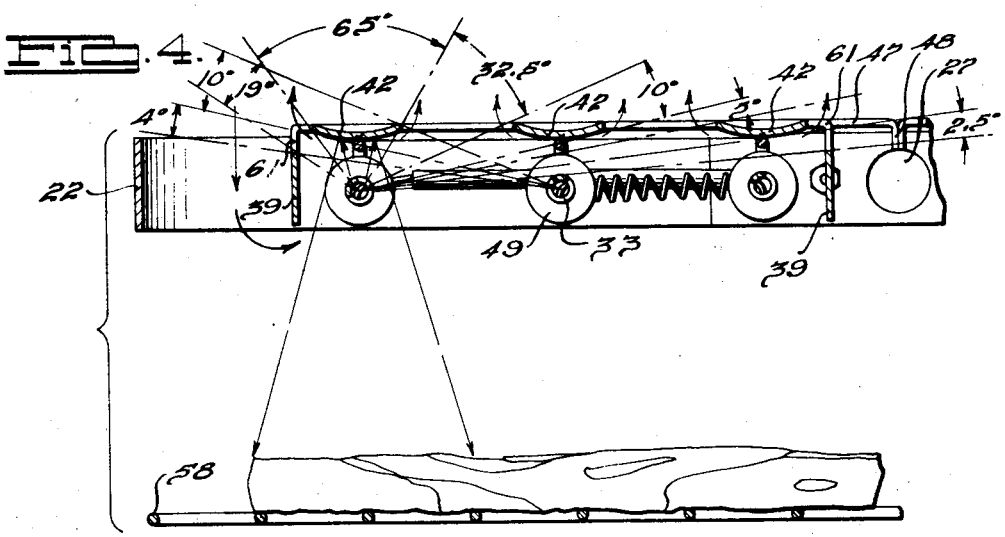
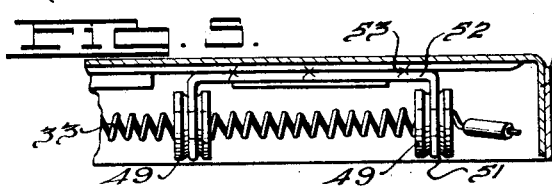
INVENTOR
Thomas E. Dadson.
BY
ATTORNEY Patented Sept. 26, 1939

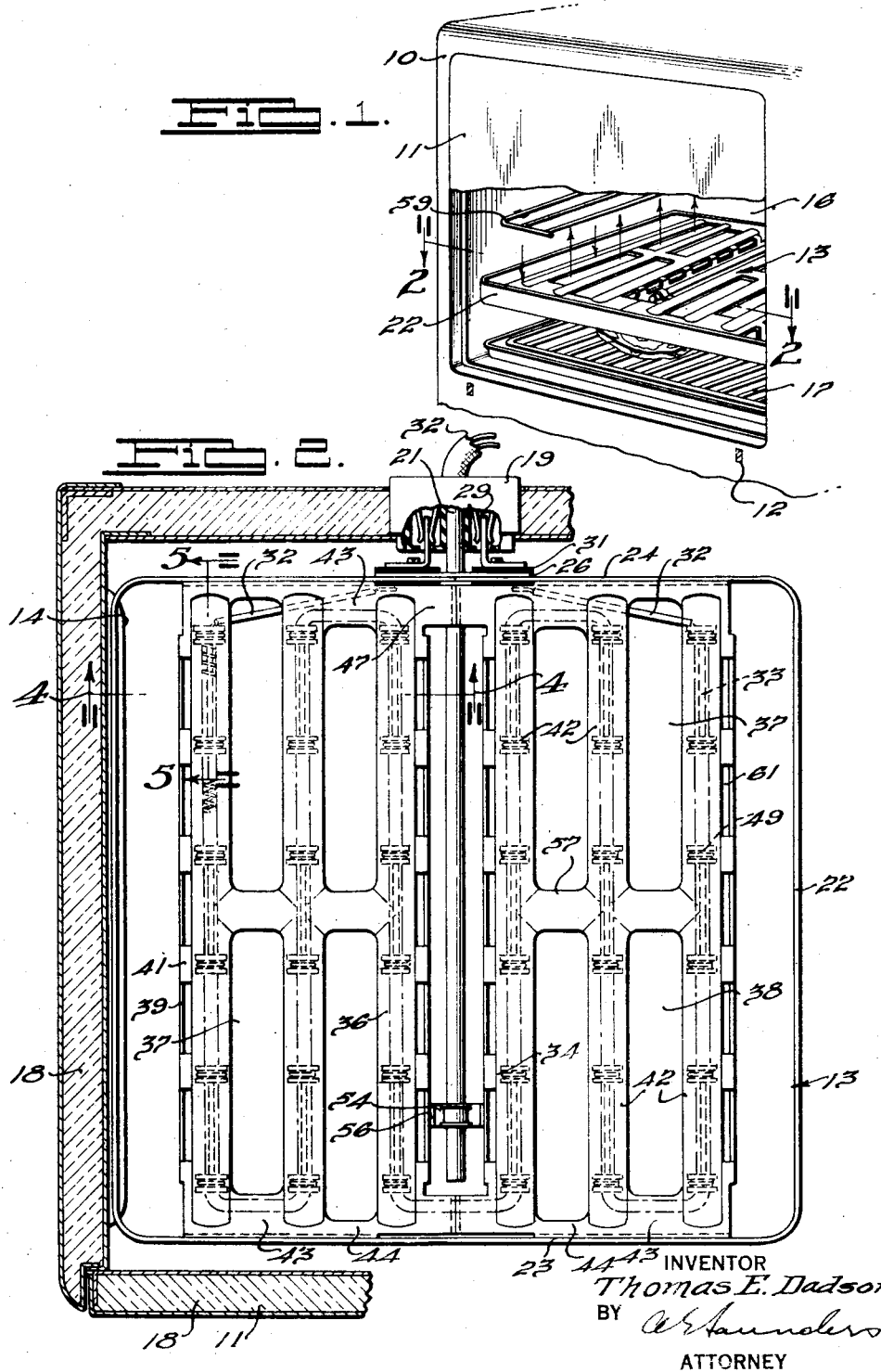

2,174,079

UNITED STATES PATENT OFFICE 2,174,079

HEATING DEVICE

Thomas E. Dadson, Royal Oak, Mich., assignor to Electromaster, Inc., Detroit, Mich., a corporation of Michigan Application November 14, 1936, Serial No. 110,865

3 Claims. (Cl. 219—35)

This invention relates to ovens and more particularly to heating systems and devices especially adapted for use therewith.

In ovens, especially in electrically heated cookstove ovens, there is frequently provided a baking compartment and a broiling compartment, the latter being at the bottom of the oven and exposed to heat radiating from the heating element which in turn is located between the baking and broiling compartments and forms a division wall between them.

In an electric oven of this nature articles in the broiling compartment are heated solely by radiant heat, conduction and convection not being at all effective for this purpose. Only half of the direct radiant heat from the heating element is available for this purpose and this I have found to be inadequate for rapid broiling. Therefore, I supplement the direct radiation by reflected radiation, as by locating a reflector above the wire which will reflect upwardly directed radiant heat back towards the broiling compartment. Such a reflector must, however, not unduly interfere with convection currents within the oven and it must be so arranged and so shaped as to be not itself overheated. It is also desirable for it to perform a shielding function to minimize the danger of physical damage to the resistance wire due to spillage in the baking compartment, and it must also allow some radiant heat to penetrate upwardly into the baking compartment to assist in warming the walls and contents thereof.

It is one of the objects of my invention to provide a heater unit for an oven of the above nature in which radiant heat alone is sufficient to heat the broiling space.

Another object of my invention is to provide a radiant heater, for an oven having baking and broiling compartments, in which a certain proportion of the upwardly directed radiant heat emitted by the wire will be reflected downwardly and be distributed over the width of the broiling compartment below.

One of the objects of my invention is to provide an oven heater in which substantially more than half of the radiant heat emitted by the hot wire is reflected downwardly into the broiling compartment, the remainder of the radiant heat and such convection currents as are present being relied upon to heat the baking compartment.

Still another object of my invention is to provide, for an oven having a baking and a broiling compartment, a single heater unit arranged to heat the broiling space by radiation alone and to heat the baking space by radiation, convection and conduction, more than half of the radiant heat being directed downwardly into the broiling compartment.

Another object of my invention is to provide a convection and radiant heater having a reflector arranged to spread downwardly-reflected radiant heat laterally of the broiling compartment.

A further object of my invention is to provide an oven having a baking and a broiling compartment heated by a single electrical heating unit having a hot wire and a curvilinear reflector.

An additional object of my invention is to provide a shielded oven heating unit which will reflect radiant heat downwardly and which will have a minimum of mass.

A still further object of my invention is to devise an improved method of heating, with a single electrical heating unit, an oven having an upper or baking compartment, and a lower or broiling compartment.

Other objects and advantages of this invention will appear in the following description and appended claims, reference being had to the accompanying drawings forming a part of this specification wherein like reference characters designate corresponding parts in the several views.

In the drawings:

Fig. 1 is a general perspective view of an oven equipped with a heater and incorporating my invention.

Fig. 2 is a section through the oven on the line 2—2 of Fig. 1 showing my heater unit in plan view.

Fig. 3 is a plan view of the lower side of my heater unit.

Fig. 4 is an enlarged view of a portion of the oven and heater taken on a line corresponding to the line 4—4 of Fig. 2.

Fig. 5 is an enlarged sectional view of a portion of my heater unit taken on the line 5—5 of Fig. 2.

Referring to the drawings, 10 illustrates an oven shell having a door 11 in one end thereof hinged in the well known manner as at 12. Within the oven is a heater unit 13 supported on side rails 14 and dividing the oven into an upper or baking compartment 16, and a lower or broiling compartment 17.

The oven 10 and the door 11 may be made of sheet metal panels separated by insulation 18. In the back wall of the oven is inserted an electrical outlet receptacle 19 which also serves as a support for an elongate temperature responsive bulb 21 forming a part of a thermostatic oven control device and projecting forwardly of the back wall of the oven The heater unit 13 comprises a sheet metal strip forming an outer loop 22 having side sections adapted to rest on the rails 14 and having a front portion 23 and a rear portion 24, the ends of the loop being joined in any convenient manner as by a strap 26, the ends of the loop and the strap being formed to provide an aperture 27 to admit the passage of the elongated bulb 21 through the rear portion 24 of the loop.

Electrical contacts 29, insulated from the rear portion 24 of the loop by washers 31, are electrically connected to a heating coil or helix 33 arranged within the loop in a manner to be described, said contacts being removably connectable with suitable contact clips in the receptacle and connected to an electric circuit as by insulated conductors 32.

Extending from the front wall 23 of the loop to the rear wall 24 thereof and supported by the loop is a shielding and reflecting device which supports the resistance wire 33, and reflects downwardly some of the heat radiating upwardly from the hot wire. This shielding means may be of sheet metal. As shown, it comprises a pair of shielding spiders 34 and 36 which may be mirror images in form and configuration. These shields 34 and 36 are provided with long parallel apertures or openings 37, with short apertures 38, and with downwardly depending identical flanges 39 connected as by strips 41 to the main portion of the shield. The apertures 37 and 38 are so arranged that the remaining portion of the shield forms spaced parallel bars or strips 42 connected alternately at their ends by wide sections 43 and relatively narrow sections 44. At each end of each shield is a downwardly depending flange 46 which may be secured as by spot welding to the front and rear portions 23 and 24 respectively of the loop 22.

The shields are provided with tongues 47 which, in assembled position project toward each other and serve as shield-spacing means, for this purpose the tongues lying in abutting relationship. A lip 48 at the end of each tongue facilitates the assembly operation.

The resistance wire 33 extends under the strips 42 back and further across the loop in rows which are below and parallel to the strips 42, and thus shielded thereby. The rows may be joined by an integral portion of the wire which lies below the wider sections 43 of the spider.

The helically wound resistance wire 33 passes through a plurality of electrical insulators 49 which may be of porcelain or other insulating material. As shown particularly in Fig. 5, these insulators 49 are provided with a central aperture through which the wire 33 is passed. The outer surface of the insultors is grooved as at 51 and a supporting wire 52 is wrapped around the insulator in the groove, the body of the wire being secured as by spot welds 53 to the longitudinally extending strips 42. As shown, each wire 42 supports two insulators 49, the adjacent wires being spaced apart to provide substantially equal spacing of the insulators 49 along the length of the resistance wire 33. As is particularly shown in Fig. 3, the strips 42 are spaced apart by an amount such that the unsupported length of resistance wire between the strips is substantially equal to the length of unsupported wire between adjacent insulators 49 along the length of each strip. With this arrangement substantially uniform support has been provided for the resistance wire along its entire length between the connections 32.

The flanges 39 are high enough to prevent damage to the wire 33 when the heater unit is touched by a flat surface such as a utensil or a utensil supporting rack.

Extending between the adjacent depending flanges 39 of the shields 34 and 36 is a support 54 for the inner end of the thermostat 28, this support having a centrally arranged aperture and flanges 56 joined as by spot welding to the flanges 39.

The top surface of the shields 34 and 36 thus comprises a plurality of strips 42 connected midway of their length by bridging sections 57. In order to provide structural rigidity the strips 42 and the connections 57 are concave upwardly resulting in a rigid structure capable of withstanding the forces induced by changes in temperature. Warping is thus minimized. With this construction the lower face of the strips 42 is convex downwardly and is located so close to the helix 33 as to intercept a substantial portion of the upwardly directed radiant heat emitted by the glowing resistance wire. As shown, the outer edges of the strips 42 subtend an angle which is substantially equal to 65°. The wire 33, the strips 42, and the depending flanges 39 are so arranged that spaces subtending arcs totaling 59° are available to permit radiant heat to pass from the portions of the wire adjacent the flanges 39 up into the baking compartment. The remaining portions transmit radiant heat upwardly through spaces subtending arcs totaling 73°. Thus substantially one-sixth of the radiant heat is passed upwardly into the oven at an appreciable angle to the vertical and impinge on the side walls of the baking compartment in such a manner as to warm them with more radiant energy than has heretofore been available.

This is of importance when the oven is being warmed up inasmuch as it is desirable that uniform temperatures may exist throughout the oven. The top portion of the oven, being heated by convection currents, would become hot faster than the side walls, were it not for the fact that radiant heat is directed sideways of the oven. The resultant distribution of so much radiant heat in a direction lateral of the oven is instrumental in producing even temperatures, and thus prevents undue temperature stresses and also promotes uniformity of oven temperature. The curvilinear cross section of the strips 42 makes it possible for radiant heat emitted by any one wire to pass obliquely upwardly into the oven not only on either side of the strip 42 immediately thereabove, but also through the space beyond the second strip at one side of said wire. Thus, even though the flanges 39 are present, and tend to reduce the proportion of radiant heat which may reach the baking compartment, each portion of the wire can emit radiant heat upwardly through at least four openings.

The spacing between each portion of the wire 33 and its overlying strip 42 is so chosen that each strip intercepts, as we have mentioned above, an arc of about 65° extending circumferentially of the center of the wire 33, that is to say, nearly 187° of the total radiant heat is in this way reflected downwardly into the broiling compartment. Thus more than one-third of the upwardly directed radiant heat, or more than one-sixth of the total radiant heat is reflected into the broiling compartment by the strip immediately above each leg or portion of the wire 33. It is well known by directing this quantity of radiant heat downwardly with a reflecting element located close to the wire, the radiant heat will still possess marked heating ability at the time it reaches the article to be broiled.

The angle of approximately 65° above referred to is a result of the spacing between the wire and the strip, and is also a result of the width of the strip. The spacing chosen is large enough to prevent undue heating of the strips 42 and hence prevent undue warping of the structure of the heating element. The width of the strips 42 allows sufficient strength to resist such small temperature induced stresses as may exist. By choosing a curvilinear cross section for the strips 42, additional strength is imparted thereto and in addition the convex surfaces reflect the heat downwardly in fan shaped formation as indicated in Fig. 4, thus tending to heat the broiling compartment more uniformly. The heat so reflected by all of the strips 42 amounts to approximately 22% of the total radiant heat emitted by the rows of the heating wire 33.

The principal accomplishment of the structure chosen is a balance between the convection-induced temperature in the baking compartment, and the temperature induced by radiant heat in the broiling compartment. Convection currents normally heat the top portion of the oven well, but are of little use in heating the lower portion or the side walls. I depend upon radiant heat for heating the broiling compartment, but in so doing it is necessary to reflect some of the upwardly directed radiant heat back into the lower compartment in order to strike such a balance between convection and radiant heat as will result in adequate heating of the baking compartment.

In Fig. 4 is also shown a series of arrows illustrating diagrammatically the path taken by convection currents of air heated by the hot wire. As illustrated, the space between strips 42 functions as outlets for the heated air, the space between the outer flanges 39 and the sides of the loop 22 serving as an opening through which cool air may descend out of the baking compartment for reheating by the resistance wire.

With a heater of this nature arranged within the oven in the manner shown in Fig. 1, the broiling compartment is heated by all of the downwardly directed heat emitted by the hot wire 33, this radiant heat being supplemented to an appreciable extent by approximately 22% of the total radiant heat or 44% of the upwardly directed radiant heat which has been reflected downwardly by the convex strips 42. On the other hand 17% of the total radiant heat is passed into the baking compartment, but in such a way that the bottoms of the baking utensils are protected against undue radiant heating. At the same time, however, the baking utensils which may be placed on the shelf 59 are heated by convection currents which rise upwardly from the resistance wire 33 through the apertures 37 and 38 and through apertures 61 lying between the flange 39 and the adjacent strip 42.

While I have described my invention with a specific embodiment, the principles involved are susceptible of numerous other applications which will readily occur to persons skilled in the art. The invention is, therefore, to be limited only as indicated by the scope of the appended claims.

I claim:

1. In combination, an electric cooking oven having a back wall, a heating unit removably disposable by an edgewise movement in said oven, said unit separating the oven into compartments, a plug connection at the back of the oven adapted to connect the heating unit in its position within the oven to an electric circuit, an elongate temperature responsive member projecting into the oven from its back wall, said unit being arranged to receive said member within its confines when the unit is moved to connected position.

2. In combination, an electric cooking oven having a back wall, a heating unit having a heating element, said unit being bodily movable edgewise into a supported position within the oven and in such position separating the oven into compartments, means removably connecting the heating element to an electric circuit when in such position, a temperature responsive member extending into the oven from its back wall into the path of movement of said unit, said unit being arranged to receive said member within its confines when the unit is moved to connected position, and means shielding the member from direct radiant heat from said heating element.

3. In a heating unit, a frame structure including an elongate strip-like portion, a heating element extending along the underside of said portion and centrally disposed thereof, a plurality of spaced insulating members associated with said heating element, and a single supporting bracket for each pair of adjacently disposed insulating members comprising an elongate member having looped end portions for respectively supporting an insulating member, said elongate member being secured intermediate its looped end portions to the adjacent strip portion.

THOMAS E. DADSON.